(12) United States Patent
Soliman

(10) Patent No.: US 7,489,240 B2
(45) Date of Patent: Feb. 10, 2009

(54) SYSTEM AND METHOD FOR 3-D POSITION DETERMINATION USING RFID

(75) Inventor: Samir S. Soliman, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 256 days.

(21) Appl. No.: 11/121,403

(22) Filed: May 3, 2005

(65) Prior Publication Data

US 2007/0008129 A1    Jan. 11, 2007

(51) Int. Cl.
*G08B 13/14* (2006.01)
(52) U.S. Cl. .............. 340/572.1; 340/572.4; 340/572.8; 340/539.12; 340/539.13; 342/42; 342/44; 342/45
(58) Field of Classification Search .............. 340/572.1, 340/572.4, 572.8, 539.12, 539.13; 342/42, 342/44, 45
See application file for complete search history.

(56) References Cited

U.S. PATENT DOCUMENTS

| | | | |
|---|---|---|---|
| 5,486,811 A | | 1/1996 | Wehrle et al. |
| 5,594,425 A | * | 1/1997 | Ladner et al. .......... 340/825.49 |
| 6,144,336 A | * | 11/2000 | Preston et al. ......... 342/357.09 |
| 6,492,941 B1 | * | 12/2002 | Beason et al. ............ 342/357.1 |
| 7,084,740 B2 | * | 8/2006 | Bridgelall ................ 340/10.42 |
| 2005/0236479 A1 | * | 10/2005 | Schmidtberg et al. ....... 235/384 |
| 2006/0109106 A1 | * | 5/2006 | Braun .................... 340/539.13 |

* cited by examiner

*Primary Examiner*—Tai T Nguyen
(74) *Attorney, Agent, or Firm*—Amin, Turocy & Calvin, LLP

(57) ABSTRACT

Determining the location of wireless devices is improved by storing location information in RFID devices. As RFID devices come within range of each other they examine a confidence level associated with each others location information. The RFID device may update their location information based upon location information received from other RFID devices that have a higher confidence level.

17 Claims, 7 Drawing Sheets

SYSTEM AND METHOD FOR 3-D POSITION DETERMINATION USING RFID

BACKGROUND

1. Field

The present invention relates generally to wireless communication devices, and more specifically to determining the location of wireless communication devices.

2. Background

The explosive growth of wireless communications has resulted in many new and valuable services being available to individuals. Many of the new services use information about the individual's location to deliver services that are personalized to an individual based on the individual's location. These types of services are sometimes referred to as Location Based Services (LBS).

Wireless communication devices have become ubiquitous in modem society. For example, many, if not most, individuals today own a cell phone. One advantage of these wireless devices, such as cell phones, is that they allow individuals to communicate while the individual is mobile. Mobility increases the challenges of providing LBS because there is no way to know ahead of time where a particular individual, or wireless device, will be located.

Many different types of LBS have been developed. For example, an individual can be provided driving directions, or could be shown ads specific to the region where the user is traveling, or some other type of information that would be valuable to an individual based on their location. Another location based service that is of great importance is locating a wireless caller that has dialed an emergency operator, or 911 operator. In the United States, calling 9-1-1 will immediately connect the caller to an emergency service operator. For example, in the United States, the Federal Communication Commission established a four-year rollout schedule, that began in Oct. 1, 2001, requiring wireless carriers to develop technologies that can provide the location of wireless callers to 9-1-1. This mandate is referred to as enhanced 911, or E911. Location service could also be used to improve aspects of a wireless communication system. For example, location service can be used to facilitate handoff in a communication system as described in U.S. Pat. No. 6,321,090 entitled "MOBILE COMMUNICATION SYSTEM WITH POSITION DETECTION TO FACILITATE HARD HANDOFF" by Soliman, filed Nov. 6, 1998, assigned to the assignee of the present application and incorporated herein in its entirety.

Two main technologies are currently used to locate a wireless device. One technique, referred to as a "network" solution, determines location of the wireless device from information obtained in the wireless network infrastructure based on interaction between a wireless device and the infrastructure. For example, the location of a receiver in the infrastructure, for example, a cell tower, that receives a wireless call is known, thereby locating a wireless device placing the call to be within the coverage area of the receiving cell tower. Also, if the transmission from a wireless device is received at several cell towers, then a form of triangulation, based on overlap of multiple cell coverage areas, may be used to determine a location of the wireless device placing the call. The wireless device can also determine its location if it receives signals from multiple, different, cell towers. In general, these techniques are not very accurate and do not work well where the infrastructure is not dense, such as in rural areas where a single cell tower may service a large region.

Another technology, referred to as a "handset" solution, uses information obtained in the wireless device, or handset, to determine the location of the wireless device. Many handset solutions use signals received at the wireless device that have been transmitted from satellites within the Global Positioning System (GPS) constellation to determine the location of the wireless device. Location based on GPS is generally much more accurate than network based solutions, but GPS signals are fairly weak, and may be "blocked" by foliage, structures, or other items in the path of the GPS signals. For example, it is generally difficult to receive GPS signals when the receiver (handset) is located within a building.

Other "hybrid" solutions have been developed to take advantage of the benefits of both a network based and a handset solution. While these hybrid techniques provide a significant advantage over either the network or handset solutions alone, there are still instances where improved accuracy is desirable.

There is therefore a need in the art for improving the determination of the location of wireless devices.

SUMMARY

Embodiments disclosed herein address the above stated needs by storing location information in RFID devices. In one aspect an RFID device includes an RF transponder, and a memory that is configured to store information about the geographic location of the device. The information about the geographic location of the RFID device may be obtained from survey information about the device location. That is, the location of the RFID device can be entered into the device when it is installed. For example, a street address of the location of the RFID device can be entered into the device. In another aspect, the information about the location of the RFID device may be learned by the RFID device as it interacts with other devices. In other words, as the RFID device interacts with other RFID devices, it may obtain more accurate location information from the other RFID device. In this case the RFID device may update its own location information based on the location information of the other RFID device.

The information about the geographic location of the RFID device can be in different forms. For example, the information of the geographic location of the RFID device can include the latitude and longitude, a street address, a floor number or an office number in a building where the device is located, the name of a destination, a license plate number of a vehicle, a bus number, or any type of information that associates with a physical presence.

The information stored in the RFID device can also include environmental information. For example, the environmental information could include information indicating the presence of smoke in a vicinity of the RFID device. The environmental information may be obtained from a sensor that is external to the device or it may be obtained from a sensor that is included with the device.

In another aspect, there is a confidence level associated with the location information. When two RFID devices are within range of each other, the two devices can exchange confidence level information and the device with the lower confidence level may update its location information based upon the location information of the device with the higher confidence level.

RFID devices can be included in many other types of user equipment. For example, RFID devices can be included with wireless communication devices, such as, cell phones, PDAs, wireless enabled computers, or other wireless communication devices.

RFID devices may also include a processor configured to update the information about the location of the RFID device.

For example the processor may update the location information of the RFID device based upon a confidence level associated with its own location information and location information received from another RFID device.

The RFID device may also use network based and handset based techniques to update its location information. For example, if the RFID device interfaces to, or includes, a GPS receiver, the RFID device may update its location information if it obtains location information from the GPS receiver that is at a higher confidence level than the confidence level of the location information currently stored in the RFID device.

Other features and advantages of the present invention should be apparent from the following description of exemplary embodiments, which illustrate, by way of example, aspects of the invention.

DETAILED DESCRIPTION

Figure 1:
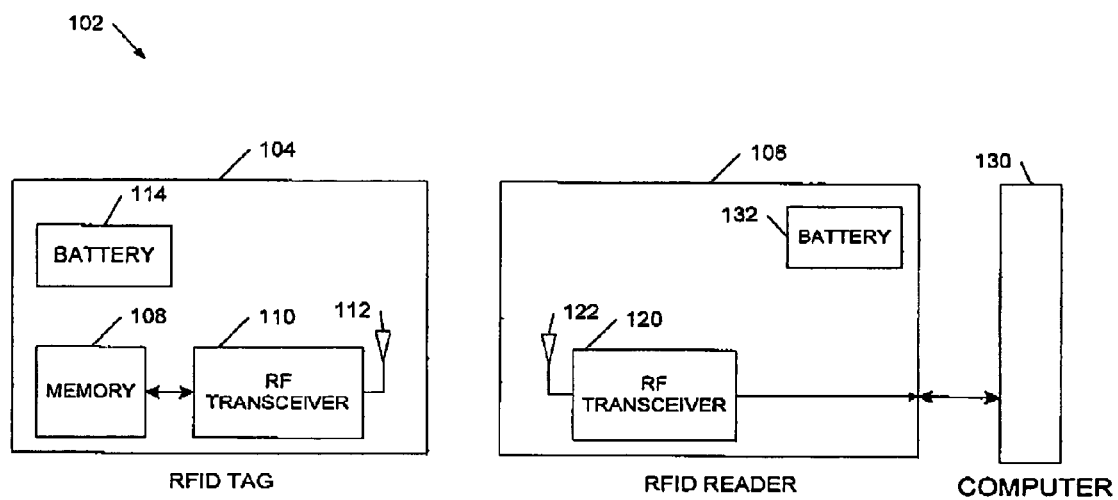
FIG. 1 is a block diagram illustrating portions of an RFID system.

The word "exemplary" is used herein to mean "serving as an example, instance, or illustration." Any embodiment described herein as "exemplary" is not necessarily to be construed as preferred or advantageous over other embodiments.

With the widespread proliferation of wireless communication devices, such as cell phones, many users often find themselves in environments where it is difficult for existing technologies to determine their location. For example, many people carry wireless devices, for example cell phones, wireless PDAs, wireless enabled computers, etc., with them as they move about. Often it is difficult to determine the location of a wireless device because of the environment surrounding the wireless device. For example, in an office building, a signal from a wireless device may not be received by multiple cell towers, or signals from multiple cell towers may not be received by the wireless device, making it difficult to determine a location based on a network solution. Determining a location using a handset solution may also be difficult because GPS signals are very weak and are often blocked inside of a building. Even if it is possible to determine a location of a wireless device inside a building using a network or handset solution, the accuracy of the location may not be adequate in an office environment to effectively determine the location of the wireless device.

For example, if a person in a high rise office building dials 9-1-1 on their cell phone, even if a location fix for the cell phone can be determined using a network or handset based solution, it may not be accurate enough to assist emergency people in locating the person. For example, Phase II of the FCC's E911 mandate requires wireless carriers to provide location information within 50 to 100 meters, in most cases. This level of accuracy will typically not be accurate enough to determine the location of the person that placed the call to within a particular office, or even the floor of the building from which the call was placed. The problem is not made easier if the person calling 9-1-1 has voice communication with the 911 operator, because the person making the call may be visiting the office building and not be able to accurately convey the location of the office they are in, or the person may be incapacitated and unable to speak even though a voice channel is available.

Recently, radio frequency identification (RFID) devices have been developed for identification and tracking of people and objects. RFID was developed for the defense industry more than 20 years ago for missile-tracking and telemetry. Technological advances have lead to smaller size and lower cost RFID devices. Reduced size and cost has lead to increasing use of RFID devices in diverse applications. For example, RFID devices are being used, on a large-scale, in Europe for animal tagging, and in the U.S. for monitoring and collecting fees at parking lots and toll roads. Another widespread application of RFID devices is in asset management of manufacturing supply chains.

While RFID devices have been used in tracking applications, they do not currently provide location information with any great accuracy. For example, if an animal is "tagged" then the animal can be tracked, for example, when it enters a pen by placing a reader at the entrance to the pen. As the animal passes by the reader, the presence of the tag is detected by the reader so it is known that the animal passed through the entrance of the pen. However, the location of the animal is not known, because the location of the animal within the pen is not known, and because the animal could enter, or leave, the pen through another entrance and it would not be detected. Likewise, an RFID reader can detect cars with tags that enter or leave a parking lot, or toll road, but the location of the car is not known, only that it passed by the reader. For example, if a car enters a multilevel parking structure, a reader may detect that the car entered the structure, but there is no information about the location of the car inside the structure, such as what floor the car is on, or if the car left the structure through a different, non-tagged exit.

As the name implies, RFID systems use radio frequency in the identification of a person or object. FIG. 1 is a block diagram illustrating portions of an RFID system. As shown in FIG. 1 an RFID system 102 includes an RFID tag 104 and an RFID reader 106. The RFID tag 104 may include memory 108 that contains data about an item, or person, to which the RFID tag 104 is attached. The RFID tag 104 also includes an RF transmitter, an RF receiver, or a transmitter/receiver combination referred to as a transceiver, 110 that transmits and receives RF signals from an RF antenna 112. As described further below, the RFID tag 104 may also include a battery 114 if the tag is an "active" tag, while a battery is not required if the tag is a "passive" tag. The RFID reader 106 includes an RF transmitter, an RF receiver, or a transmitter/receiver combination referred to as a transceiver 120 that transmits and receives RF signals from an RF antenna 122. The RFID reader 106 may also include a port through which the RFID reader 106 can send and receive data with a host system 130 for processing. The RFID reader 106 may be powered by an external device, or it may be powered by an internal source such as a battery 132.

A device may include both an RFID tag 104 and an RFID reader 106. That is, a device may be configured to be interrogated by other devices, thereby acting as an RFID tag. The same device may be configured to interrogate other RFID devices, thereby acting as an RFID reader. For example, a wireless communication device, such as a cell phone, may be configured to be interrogated by other devices, thereby acting as an RFID tag, and the same cell phone can be configured to interrogate other devices, thereby acting as an RFID reader.

There are two basic types of RFID systems: passive, those where the RFID tag is powered by external energy; and active, those where the RFID tag is battery assisted. Typically, a passive RFID system includes an RFID reader 106, also called an interrogator, an RF tag 104, also called a transponder, and a host computer 130. In a passive system, the RFID tag 104 is powered by RF energy transferred from the RFID reader 106. When receiving RF power from the RFID reader 106, the RFID tag 104 transmits information stored in the memory 108 of the RFID tag 104 back to the RFID reader 106. This transmission is often called backscattering. By detecting the backscattering signal, the information stored in the RFID tag 104 can be fully identified by the RFID reader 106.

In an active system, the RFID tag 104 includes an internal power source, such as a battery 114. Because the RFID tag 104 in an active system uses an internal power source, the RFID tag 104 may be continuously powered and may transmit information stored in the RFID tag 104 continuously, at predetermined intervals, or when requested by an RFID reader 106. In addition, the RFID tag 104 may be configured such that most of the RFID tag circuitry goes into a "sleep" mode and at predetermined intervals, or when requested, power is applied to the necessary circuitry so that the RFID tag 104

Active RFID tags tend to be larger and more expensive than passive tags because they contain more electronics due to the fact that they actively transmit data to a reader. In comparison, passive RFID tags can generally be smaller because they draw power from the magnetic field generated between the passive tag itself and a reader to power its microchip's circuits, allowing information stored in the tag to be sent back to the reader. In addition, because RFID systems use RF communication between the RFID tag 104 and RFID reader 106, a "line-of-sight" between the tag and reader is not required.

In general, passive RFID systems may be either short or long range. They may also include storage that is read-only, read-write, or write once. Passive RFID tags usually are less expensive, and smaller, than corresponding active RFID tags. Thus, passive RFID tags may be preferred when monitoring lower cost/value goods.

In contrast, active RFID tags include their own power source (such as a battery), and therefore any associated reader does not need to power the tag. Active RFID systems allow very low-level signals to be received by the RFID tag and the active tag can transmit high power signals, using its internal power source, back to the reader. Active RFID systems may have longer communication range between the tag and the reader, and may support additional functions such as multi-tag collection capability and the ability to add sensor and data logging capability.

In one embodiment, tags may either provide active presence or active location information. This means that they can either provide general information about the presence of an object or item, or more precise location information. Active location RFID systems support a higher effective read range with greater resolution capabilities, allowing for more precise tag location determination. Read-write tags may have reduced range due to the increased signal overhead of the full duplex communications, possibly reducing the effectiveness of these systems to perform location determination as well as read-only systems.

Table 1, below, summarizes some of the general technical differences between passive and active RFID systems.

TABLE 1

Comparison of passive and active RFID technologies

| Feature | Passive RFID | Active RFID |
|---|---|---|
| Transponder power source | Energy transferred from the reader via RF | Internal |
| Transponder battery | No | Yes |
| Availability of transponder power | Only within field of reader | Continuous |
| Required signal strength from reader | High | Low |
| Available signal strength from transponder to reader | Low | High |

RFID systems, in general, can be configured to operate in a variety of frequencies from low frequencies to ultra-high frequency (UHF) or even microwave frequencies. RF propagation is different at different frequencies due, for example, to power and wave form properties. The frequency used in a particular RFID system configuration should take into consideration the applications that the system is designed to support. For example, low frequency systems may be preferred for applications in which the distance between tag and reader is small, for example, less than about a foot. RFID systems that use UHF may be preferred for applications where the distances between the tag and the reader are greater, for example, up to about 20 feet.

Some typical RFID systems operate at approximate frequency ranges from about 100 kHz to 2.5 GHz. Table 2 below summarizes some characteristics, and typical applications, for several different frequency bands.

TABLE 2

Typical characteristics and applications for different bands

| Frequency band | Characteristics | Example Applications |
|---|---|---|
| Low (about 100-500 kHz) | short to medium read range inexpensive low read speed | access control animal identification inventory control |
| high (about 10-15 MHz and about 850-950 MHz) | short to medium read range potentially inexpensive medium reading speed | access control smart cards |
| ultra-high (about 2.4-5.8 GHz) | long read range high reading speed line of sight required expensive | railroad car monitoring toll collection systems vehicle identification |

RFID tags can include memory that may be configured as read-only, volatile read/write, or write once/read many. Configuring RFID tags with different frequency bands and memory types can optimize an RFID tag for a particular application. As discussed farther below, different configurations of RFID tags can be used in different embodiments in accordance with the invention.

Figure 2:
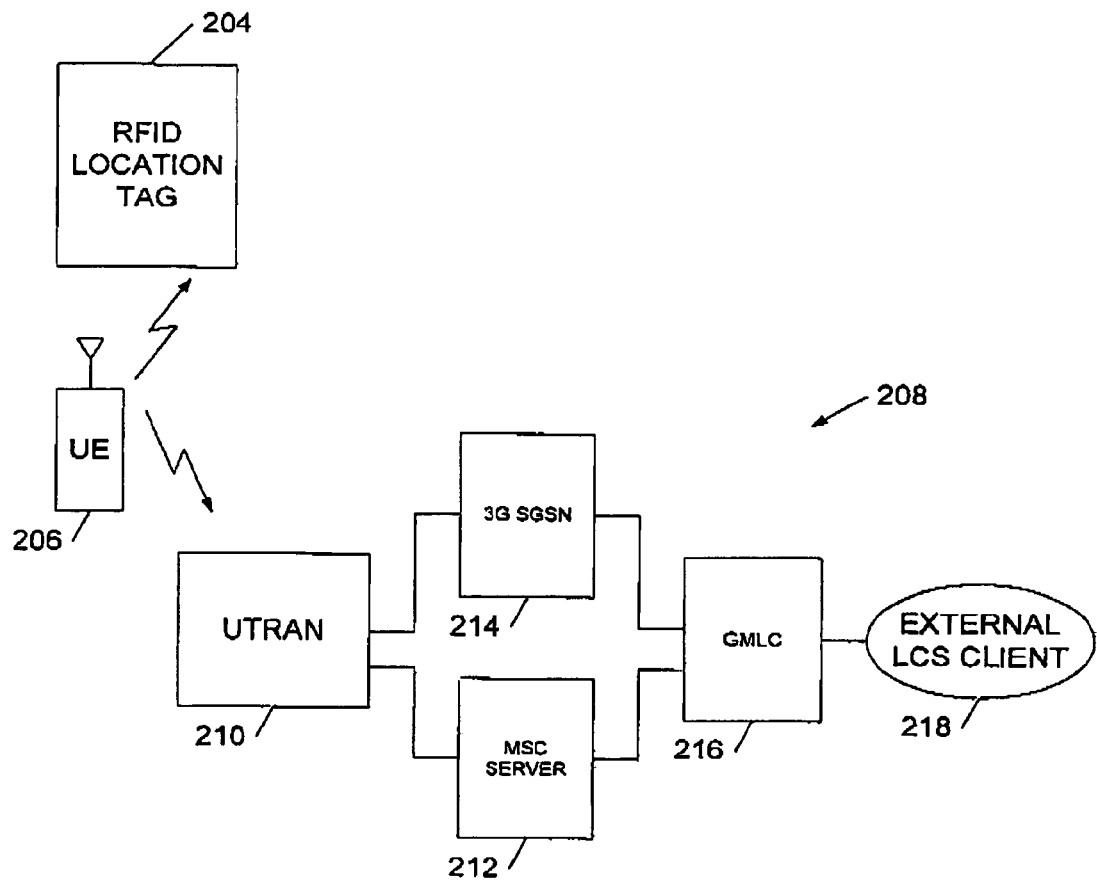
FIG. 2 is a block diagram of a geographic location system utilizing RFID techniques in accordance with the invention.

FIG. 2 is an example of a geographic location system utilizing RFID techniques in accordance with the invention. In the example illustrated in FIG. 2 there is an RFID tag 204 and a piece of user equipment 206. The user equipment may be in communication with a network 208. Communications are indicated by arrows in FIG. 2. Examples of the network 208 include a _UMTS Terrestrial Radio Access Network (UTRAN) 210, a mobile switching center (MSC) server 212, a third generation _Serving GPRS Support node (3G SGSN)

214, and a Gateway Mobile Location Center (GMLC) 216 that may be in communication with an external LoCation Service (LCS) client.

The RFID tag 204 may be an active or passive tag. In one embodiment the RFID tag includes information about the geographic location of the tag. As the user equipment 206 comes in proximity to the RFID tag 204, the location information stored in the tag is transferred to the user equipment 206. The user equipment 206 may then use the location information received from the tag to update its own location information. The user equipment 206 may perform the functions of both an RFID reader and an RFID tag. That is, the user equipment may read information, such as location information, from a tag and the user equipment may also act as a tag by having its location information read by another device, such as another piece of user equipment or another RFID tag. For example, if the user equipment 206 is a cell phone, it may include a reader to read RFID tags as well as being able to communicate information location that is stored by the cell phone to other user equipment, such as other cell phones.

Location information may be loaded into memory in the RFID tag 204 when the tag is placed in a location. For example, if a tag is installed at a fixed location, then information about that geographic location can be loaded into the memory of the tag. In other words, a tag can be "surveyed" and its known location loaded into the tag's memory. The survey can be performed using GPS devices, or the survey information can include known information, such as street address or office location.

After the tag has been installed and its location stored into memory, then as user equipment comes within range of the tag, the location information can be transferred from the tag to the user equipment. Because the range of the tag is generally limited, user equipment that can receive information from the tag will have nearly the same geographic location as the tag. In this manner, user equipment can update its location based on the location information received from the tag. As the user equipment moves about and comes within range of other tags, the user equipment can continue to update its location based on location information.

Various types of information about the geographic location of the device can be stored in the RFID tag. For example, the information about the geographic location of the RFID device can include latitude/longitude information, a street address, location within a building such as the floor of the building or a specific office or conference room in the building, the name of a location, or any information that associates with a physical presence, such as a license number of a vehicle, or a bus number. The RFID can also store other information that may be useful to the user equipment. For example, the RFID tag can include, or interface to, sensors that provide additional information. One example would be to include environmental sensors, such as a smoke detector that can provide information relative to a fire or other hazard that may be at the tag's location.

The RFID tag may also be configured to "learn" information about its location rather than being "surveyed" in place. That is, the RFID tag may be installed with an estimated value of its location, or the RFID may be installed with no information about its location. As user equipment, such as wireless communication devices like cell phones, PDAs, wireless enabled computers, or other wireless communication devices, come within the range of the RFID tag, the user equipment may transfer location information to the RFID tag. In this way the RFID tag may "learn" its location from other devices that have knowledge about location that come in proximity to the tag. The RFID tag may include a processor configured to update location information stored in the memory of the RFID tag if the tag receives additional, or more accurate, location information.

Location information may also be configured to include information of a "confidence level" of the location information. For example, if an RFID tag is "surveyed" in place, its location information will probably have a very high confidence level. On the other hand, if an RFID has "learned" its location from other devices then the confidence level may be lower, depending in part on the confidence level of the location information used in the learning process. For example, if an RFID learns its location from user equipment that has recently updated its location from a location source with a high confidence level, then the confidence level of the RFID tag's location may be higher than if the user equipment has not updated its location for a long period of time, or if the user equipment received its location for a source with a low confidence level. As RFID tags and user equipment communicate with each other they can examine each other's confidence level and decide whether to update their location information.

Figure 3:
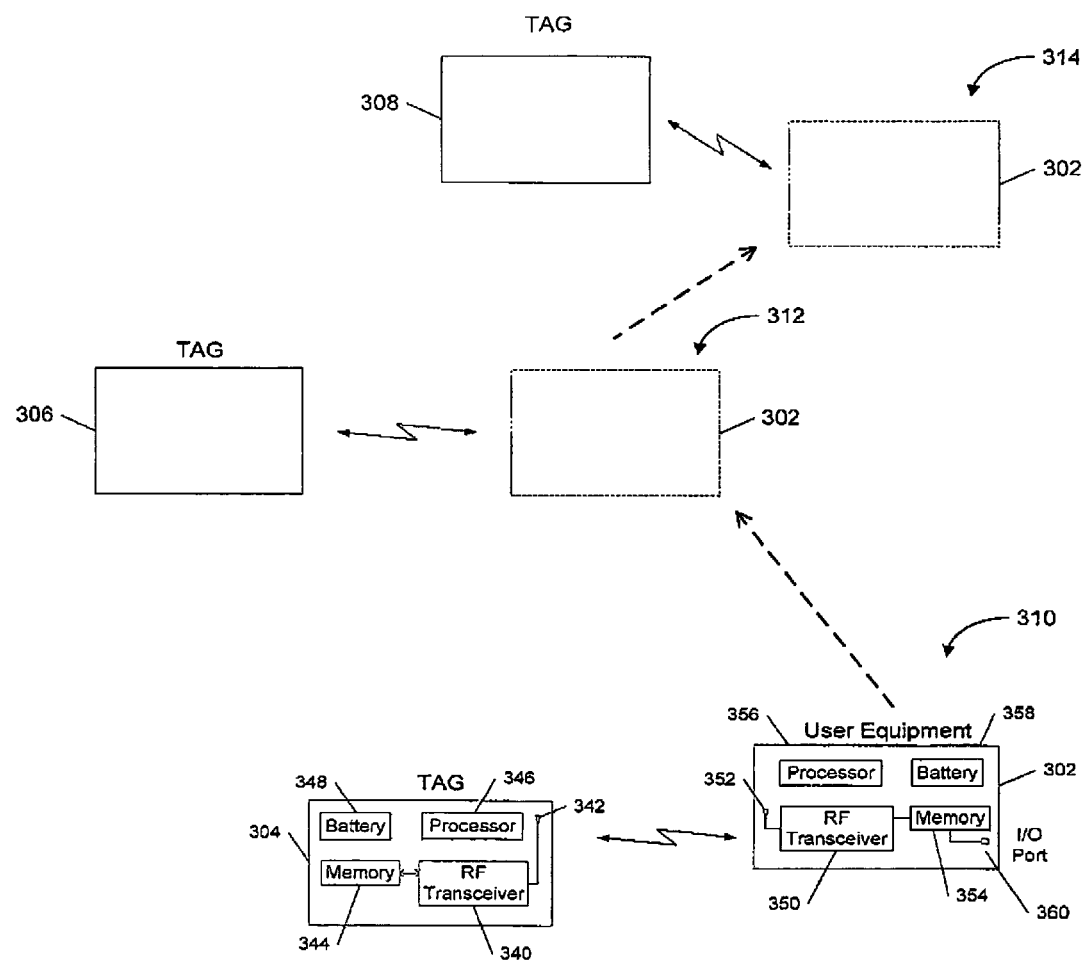
FIG. 3 is a block diagram illustrating aspects of a geolocation system using RFID devices.

FIG. 3 is an example of a geolocation system using RFID devices. The example illustrated in FIG. 3 includes a piece of user equipment 302 that is equipped with a reader, and three RFID tags 304, 306, and 308. In FIG. 3, the user equipment 302, as described further below, is mobile and shown at three different locations 310, 312, and 314, as the user equipment 302 moves about.

The tags 304, 306, and 308 include an RF transponder 340, an antenna 342, and a memory 344. The memory is configured to store information about the location of the tag. The tag may also include a processor 346. The processor can be configured to update the location information in the memory 344 if location information with a sufficient confidence level is received by the tag. The tag may also include a battery 348.

The reader in the user equipment 302 include an RF transponder 350, an antenna 352, and a memory 354. The memory is configured to store information about the location of the user equipment 302. The reader may also include a processor 356. The processor can be configured to update the location information in the memory 354 if location information with a sufficient confidence level is received by the reader. The reader may also include a battery 358, and an I/O port 360. The I/O port 360 can be configured to interface the reader to other components in the user equipment 302 or to devices external the user equipment 302.

In this example, the three tags are at different locations and the user equipment 302 is mobile. When the user equipment 302 is at a first location 310 it is in close proximity to the first tag 304. The user equipment 302 and the first tag 304 can exchange information about location. For example, the first tag 304 may have been "surveyed" in and have a high confidence level in its location information. The user equipment 302 may also have location information but the user equipment confidence level might be at a lower confidence level. In this scenario, the user equipment 302 may update its location information based upon the location information it receives from the first tag 304 having a higher confidence level.

As the user equipment 302 moves to a second location 312 it comes within the range of the second tag 306. The user equipment and the second tag will interact with each other, for example, they will examine the confidence level each has in its location information. For example, the user equipment 302 may have a high confidence level that its location information is still fairly accurate, because it has been a short time since it updated its location based on the first tag 304, and the second tag 306 has a low confidence level. In this scenario, the second tag 306 will update its location, and confidence level, based on the location information received from the user equipment 302.

As the user equipment 302 moves to a third location 314 it comes within the range of the third tag 308. The user equipment 302 and the third tag will examine the confidence level each has in its location information and update their location information accordingly. It is noted that many things can effect the confidence level. For example, if a tag or user equipment has been surveyed in, or includes a GPS receiver and has recently had a good "fix" the confidence level may be high. On the other hand, if a tag or user equipment is mobile, the confidence level will decrease as the period of time since the last location update increases.

If the user equipment 302 and a tag both have the same confidence level, for example, both have a high confidence level, then both devices may determine to maintain their current location information, and not change it based on the location information of the other device.

The confidence level of a device may be set in different ways. The confidence level may be set when a device is installed at a location. For example, a high confidence level can be set during installation of an RFID device if the location information, such as a street address, is entered into the device memory. The confidence level can also be set automatically, such as when a device updates its location information based on information received from another device that has a higher confidence level. For example, a device can set its confidence level to the same confidence level as the confidence level of information received from another device. Or, the device may "factor" its confidence level to take into account uncertainty about the information received from the other device. In addition, the confidence level may be adjusted based on other influences. For example, the confidence level of a mobile device may be adjusted down as the time since the last location update increases. Because the device is mobile, as the location information "ages" it may become less accurate and thus should have a lower confidence level associated with it.

Other examples of things that can influence the confidence level include the type of location solution. For example, a higher confidence level may be associated with a location solution that is based on GPS versus a network solution because, in general, a GPS solution will be more accurate than a network based solution. However, the confidence level can be adjusted based upon the robustness of the solution, for example the number of GPS satellites, or the number of cell towers used in the solving for the location. The confidence level can also be adjusted based upon the strength of the signals used to determine the location.

The confidence level can be represented in many different ways. In one example, the confidence level can be represented as "high", "medium", or "low." In another example, the confidence level can be represented as a numerical value with different numeric values representing different confidence levels. For example, the confidence level can be represented as a value between one and ten, with either a higher, or a low, numeric value representing a higher, or lower, confidence level, Other techniques can also be used to represent the confidence in such a way that the respective confidence levels of different devices can be compared.

Examples of user equipment may include cellular telephones, wireless enabled personal computers, and personal digital assistants (PDA), and other wireless devices. The user equipment may be designed to support one or more wireless standards. For example, the standards may include standards referred to as Global System for Mobile Communication (GSM), General Packet Radio Service (GPRS), Enhanced Data GSM Environment (EDGE), TIA/EIA-95-B (IS-95), TIA/EIA-98-C (IS-98), cdma2000, Wideband CDMA (WCDMA), High Rate Packet Data (HRPD), and others. In addition, the user equipment may be equipped with location determination equipment, such as a GPS receiver.

Figure 4:
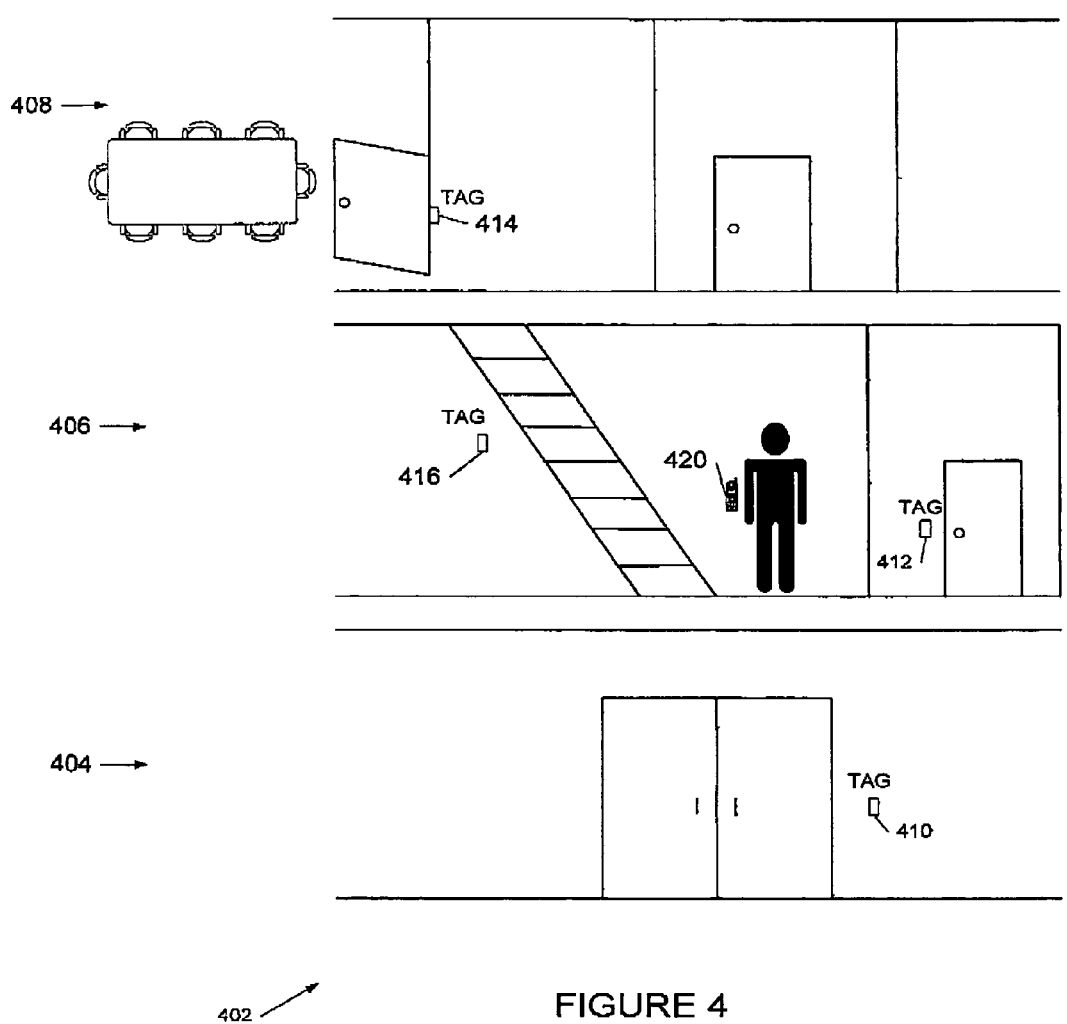
FIG. 4 is a diagram illustrating an example of a geolocation system using RFID tags.

FIG. 4 is a diagram illustrating an example of a geolocation system using RFID tags. Illustrated in FIG. 4 is an office building 402 that includes a first, second, and third floor 404, 406, and 408 respectively. In this example, a first RFID tag 410 is installed at the entrance to the building. There may be additional tags located throughout the building. For example, there may be a second tag 412 located at the entrance to an office on the second floor. A third tag 414 located at an entrance to a conference room on the third floor, and a fourth tag 416 in the stairway between the second and third floors. Additional tags may be installed at other locations throughout the building.

In this example, it is assumed that the location of all of the tags 410, 412, 414, and 416 is based on survey information wherein known accurate geographic location information is entered into tags when the tags are placed in a location. The location information stored in the tags may include latitude and longitude (lat/long), street address, floor, or room location, or any combination of these. For example, the first tag 410 that is installed at the entrance to the building on the first floor 404 may include lat/long, as well as street address, or name of the building. The second tag 412 at the entrance to the office on the second floor 406 may include lat/long and altitude, street address, building name, floor number, office number, office location such as the southwest corner office, or any combination of these types of information. The other tags located throughout the building may include like information. Because the tags have been "surveyed" in and they are fixed at their location, the tags may not ever update their location information. In this case the tags may be configured to include an RF transmitter but not an RF receiver. In other words, in this example the RF transceiver 340 described in FIG. 3 only transmits location information.

As user equipment 420 comes within range of the tags 410, 412, 414, and 416, because the tags have been surveyed in and their confidence level is high, the user equipment may update its location. For example, a person with a piece of user equipment, for example, a cell phone 420 can update their location as they move within range of the tags. That is, as the person enters the building they will come within range of the first tag 410 at the entrance of the building and they can update their location accordingly. As the person goes into their office on the second floor they will come within range of the second tag 412 and again update their location. Later as the person walks up the stairs to the conference room on the third floor they will pass within the range of the fourth tag 416. And, as they enter the conference room they will come within range of the third tag 414 at the entrance to the conference room. As the user equipment 420 comes within range of each tag it will update its location accordingly.

Updating the location of the user equipment 420 as the equipment is moved about provides many benefits. For example, if the user equipment 420 is a cell phone, then if a person calls 9-1-1, accurate location information can be provided to the 9-1-1 operator. In this way, if a person dials 9-1-1, the 9-1-1 operator will know that the person is in a particular building, the buildings address or location, and also what floor and room the person is in. Because the location information is updated as the person moves about, the 9-1-1 operator will know if the person is in their office on the second floor or in the conference room on the third floor.

Knowledge of a person's location in an emergency is a very valuable piece of information. The techniques described have significant advantages over existing network based and handset based technologies. For example, network based solutions generally do not provide enough accuracy to be able to identify which office, or even which floor, of a building a person is located. Also, handset solutions, such as ones that use GPS may be able to provide accurate location information in some environments, GPS does not work as well in other environments, such as inside buildings. That is, a GPS receiver may work very well if it has a clear "view" of the sky so that it can receive the satellite signals. However, GPS receivers do not work well in urban canyons where tall building may block the receiver's view of the sky, or in buildings, or tunnels, such as subways.

It is also noted that the tag 410 that is located at the entrance to the building 402 can update user equipment that passes by even if the person does not enter the building. For example, as user equipment passes by the building, such as people walking by on the sidewalk with their cell phones, location information from the tag 410 may be received and used to update the location of the user equipment. In this way, user equipment location can be reliably updated in locations, such as urban canyons, where convention location equipment, such as GPS receivers, do not function well.

Figure 5:
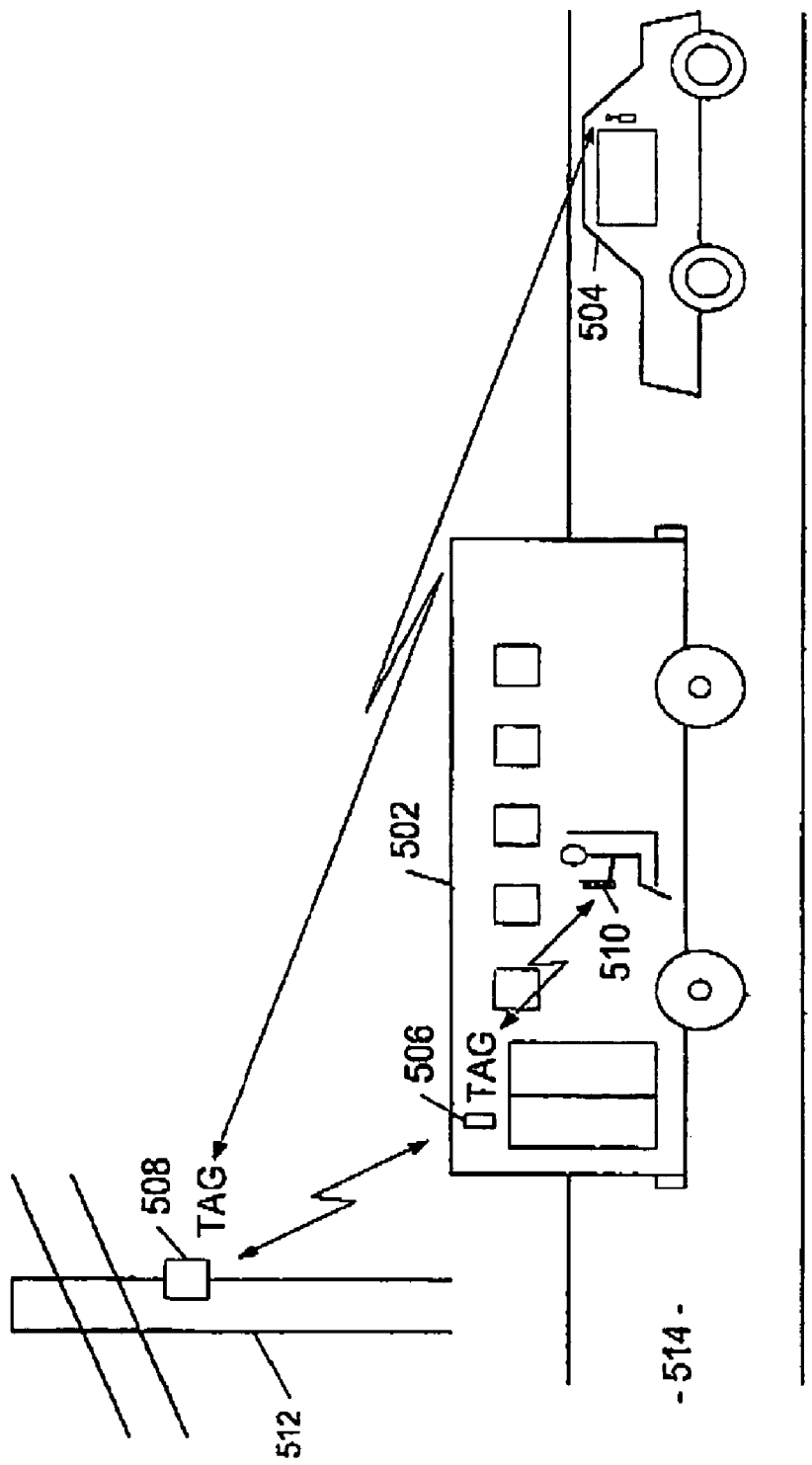
FIG. 5 is a diagram illustrating another example of a geolocation system using RFID devices.

FIG. 5 is a diagram illustrating another example of a geolocation system using RFID devices. Illustrated in FIG. 5 is a public transit vehicle, such as a city bus 502, and a personal vehicle 504. In the example, a tag 506 is located on the bus 502. Information included in the tag 506 on the bus 502 can include location information obtained from conventional location equipment on the bus, such as a GPS receiver on the bus, or updated from other RFID devices that the bus passes near as it moves about. For example, there may be a tag 508 that is located near the path of the bus, such as on a utility pole 512 next to the street 514. The tag 508, may have been surveyed in or it may have been installed and then learned its location from other RFID devices, as discussed above.

User equipment located near, or in, the bus 502 may receive location information from the tag 506 located on the bus. For example, a passenger on the bus may have a cell phone 510 equipped with a reader. The cell phone 510 or the tag 506 may update their location information based on their respective confidence levels. In addition, the tag 506 located in the bus may include information, such as bus number or license plate number, and the like, that the cell phone 510 may receive to assist in locating the person. As the bus 502 travels about it will use any location equipment available to it, such as a GPS receiver on the bus, as well as interact with any other RFID devices that it comes within range of to update its location.

In one example, a person with a cell phone that is enabled as an RFID device, may get onto the bus 502 and, depending on their respective confidence levels, the cell phone or the tag 506 on the bus will update their location. The cell phone may also receive information about the bus, such as bus number or license number. As the bus 502 travels about it will update its location, for example as it passes other tags 508 and the cell phone location will be updated accordingly. In addition, the cell phone may also update its location based on network or handset solutions, and update the tag 506 accordingly. For example, the cell phone may have a GPS receiver and the bus may not. If the cell phone obtains a good "fix" from its GPS receiver, it may update its own location information as well as the location information of the bus tag 506.

The personal vehicle 504 may also include an RFID device, such as in a cell phone. As the personal vehicle 504 travels about it may also update its location, for example, from its own network or handset based solutions, or if it comes within range of other RFID devices, such as the tag 508 on the utility pole 512. In addition, the RFID devices in the personal vehicle 504 and bus 506 may exchange location information if they come with range of each other.

In one embodiment, an RFID device can be read by a piece of User Equipment (UE). The UE can then use the positioning information for its own application or if requested can send the location information to a location server that can pass the location information to an entity that has requested the position of the UE.

In addition to position information encoded on the RFID transponder (RFID tag), such as 3-D positioning information, the RFID device can also contain a variety of information about the place or location, including land mark description, through the use of an electronic landmark code (ELC). The ELC is an electronic representation of the place, which can include information about the place, owner, important number to call, etc.

It is noted that combining RFID systems with sensor applications enables solutions such as detecting when a uniquely identified object has come into contact with a particular type of environment, such as an area that is too hot, too dusty, too humid, etc. Sensor systems can also provide valuable Customer Relationship Management (CRM) data via RFID communication such as detecting that a car engine needs maintenance when a consumer brings a car in for a different repair.

As discussed earlier, RFID uses wireless technology to identify, locate and track assets, people, and animals. Adding location information to an RFID device can be invaluable for applications in which uniquely identifying the item/object is critical due to concern over safety or quality assurance such as management of hazardous materials or manufacturing situations in which quality control depends on precise parts control.

Following is an analysis of aspects of a geolocation system using RFID technology. In this analysis it is assumed that the transponder is using a loop antenna for receive and a dipole antenna to backscatter the information to the reader (interrogator). It is also assumed that the wireless device is using a dipole antenna for transmit and receive on the reader side. The range equations (signal power level on the forward link and the return link) can be written as:

$$P_{forward} = P_{IT} + G_{IT} + G_{TR} - L_c - 20\log(4\pi R/\lambda) \quad \text{Eq. 1}$$

$$P_{return} = P_{IT} + G_{IT} + G_{TR} + G_{TT} + G_{IR} - 2L_c - 40\log(4\pi R/\lambda) \quad \text{Eq. 2}$$

where:
$P_{IT}$=Interrogator transmit power [dBm]
$G_{IT}$=Interrogator transmit antenna gain [dBi]
$G_{TR}$=Transponder receive antenna gain [dBi]
$L_c$=Antenna cable loss [dB]
$G_{IR}$=Interrogator receive antenna gain [dBi]
$G_{TT}$=Transponder transmit antenna gain [dBi]
R=Range [ft]
$\lambda$=Wavelength [ft]

In other embodiment, the wireless device can use a high gain directional antenna to increase the range if necessary.

Figure 6:
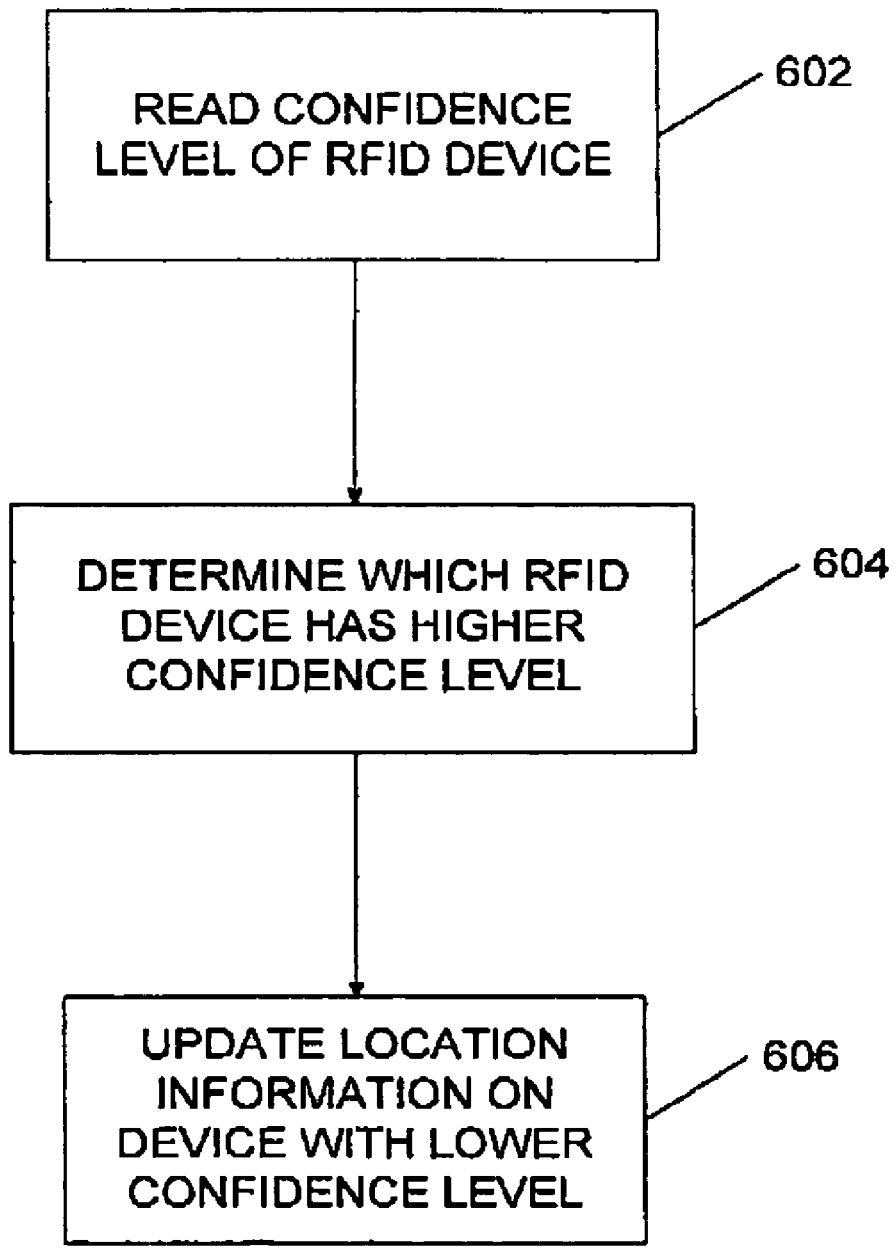
FIG. 6 is a flow chart illustrating aspects of updating location information of a geolocation RFID device.

FIG. 6 is a flow chart illustrating aspects of updating location information of a geolocation RFID device such as the transponder or tag described above. Flow begins in block 602 where the RFID device, such as a cell phone, comes within range of another RFID device, such as a tag. The RFID device reads the confidence level of the other RFID device. In one embodiment one RFID device includes a reader and the other RFID device does not, such as an RFID tag. In another embodiment, both RFID devices may include readers, for example, both RFID devices may be cell phones that include readers.

Flow continues to block 604 where it is determined which RFID device has a higher confidence level in its location information. Flow continues to block 606 where if one of the RFID devices has a lower confidence level, then the device with the lower confidence level updates its location information based upon the location of the RFID device with the higher confidence level. If both RFID devices have the same, or about the same, confidence level then both RFID devices may maintain their own current location information. Alternatively, if the confidence levels are the same, or about the same, other secondary considerations may influence whether a device maintains, or changes, its confidence level. Examples of secondary considerations that may influence whether a confidence level is changed or not include if the device is stationary or moving, the speed at which a device is moving, the source of the location information, for example, was the location information obtained from GPS directly or was it obtained from another device, etc.

Figure 7:
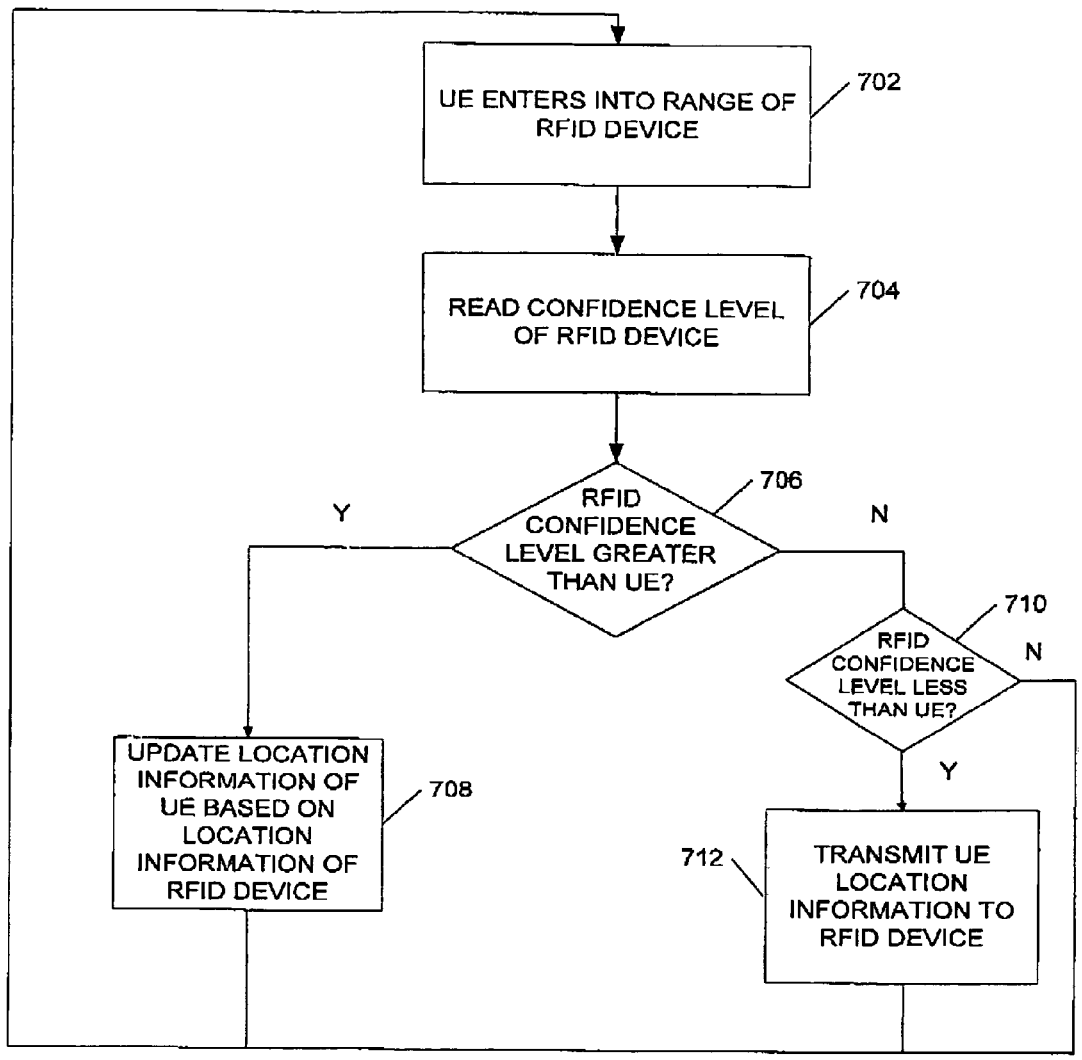
FIG. 7 is a flow diagram illustrating additional aspects of updating location information of a geolocation RFID device.

FIG. 7 is a flow diagram illustrating additional aspects of updating location information of a geolocation RFID device. Flow begins in block 702 where a piece of user equipment (UE), such as an RFID enabled cell phone, comes within range of an RFID device and interrogates it. Flow then continues to block 704 where the UE reads a confidence level of the RFID device. The confidence level is an indication of likelihood that the location information stored in the RFID device is accurate and correct. Flow continues to block 706 where the UE compares its own confidence level in its location with the confidence level of the RFID device. If the confidence level of the RFID device is greater than the confidence level of the UE, an affirmative outcome, then flow continues to block 708. In block 708 the UE updates its location information based on the location information of the RFID device. Flow then continues to block 702 where the UE monitors to detect when it comes within range of another RFID device.

Returning to block 706, if the confidence level of the RFID device is not greater than the confidence level of the UE, a negative outcome, then flow continues to block 710. In block 710 the UE compares its own confidence level in its location with the confidence level of the RFID device to determine if the RFID device confidence level is less than the UE confidence level. If the RFID confidence level is less than the UE confidence level, an affirmative outcome, then flow continues to block 712 and the UE transmits its location information to the RFID device. The RFID device, depending on its configuration, may update its location information based on the location information received from the UE. Flow then continues to block 702 where the UE monitors to detect when it comes within range of another RFID device.

Returning to block 710, if it is determined that the RFID device confidence level is not less than the confidence level of the UE, a negative outcome, then the two devices have the same confidence level. In this case, both the RFID device and the UE maintain their own current location information and flow continues to flow continues to 702 where the UE monitors to detect when it comes within range of another RFID device.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An RFID tag, comprising:
   an RF transceiver;
   a memory including information indicative of a geographic location of the RFID tag and information indicative of a confidence level associated with the location of the RFID tag, the memory in communication with the RF transceiver; and an antenna in communication with the RF transceiver configured to receive signals from and send signals to an RFID reader;

wherein the RFID tag is configured to obtain at least some of the information indicative of the location of the RFID tag as a result of interacting with other devices and to exchange confidence level information with a second RFID tag, wherein a processor in the RFID tag updates is configured to update the location information if it has a confidence level less than that of the second RFID tag.

2. An RFID tag as defined in claim 1, wherein the information is selected from the group consisting of information indicative of latitude and longitude values, information indicative of a street address, and information indicative of a location within a building.

3. An RFID tag as defined in claim 1, further comprising means for obtaining survey information.

4. An RFID tag as defined in claim 1, wherein the RFID tag is configured to obtain at least some of the information indicative of the location of the RFID tag as a result of interacting with other devices.

5. An RFID tag as defined in claim 1, further comprising a sensor configured to receive environmental information.

6. An RFID tag as defined in claim 5, wherein the environmental information includes information indicating the presence of smoke in a vicinity of the RFID tag.

7. A mobile device comprising:
an RFID reader;
an RFID tag comprising an RF transceiver, a memory including information indicative of a location of the mobile device, and an antenna configured to receive and send signals to an RFID reader; and
a processor configured to update the information indicative of the location of the mobile device based upon a confidence level; and
means for transmitting information indicative of the location of the mobile device to a second mobile device.

8. A mobile device as defined in claim 7, wherein the second mobile device comprises an RFID tag.

9. A mobile device as defined in claim 7, wherein the second mobile device comprises a cell phone.

10. A method of determining location of an RFID tag, the method comprising:
interrogating an external device wherein the external device comprises a second RFID tag;
determining a confidence level of location information stored within the external device, and
updating location information of the RFID tag based on location information of the external device if the confidence level of the external device location information is greater than a confidence level of the RFID tag location information.

11. A method as defined in claim 10, further comprising transmitting the location of the RFID tag to the external device if the confidence level of the RFID tag location information is greater than the confidence level of the seems external device location information.

12. A method as defined in claim 10, wherein the RFID tag is included in a mobile device.

13. A method as defined in claim 10, wherein the external device is mobile.

14. A method as defined in claim 10, wherein the mobile device comprises a cell phone.

15. A method as defined in claim 10, wherein the external device comprises a cell phone.

16. An RFID tag comprising:
means for interrogating an external device wherein the external device comprises a second RFID tag;
means for determining a confidence level of location information stored within the external device, and
means for updating location information of the RFID tag based on location information of the external device if the confidence level of the external device location information is greater than a confidence level of the RFID tag location information.

17. An RFID tag as defined in claim 16, further comprising means for transmitting the location of the RFID tag to the external device if the confidence level of the RFID tag location information is greater than the confidence level of the external device location information.

* * * * *